US011461078B2

(12) United States Patent
Lextrait (10) Patent No.: US 11,461,078 B2
(45) Date of Patent: Oct. 4, 2022

(54) DEVICE AND METHOD FOR PRODUCING A BACKEND APPLICATION UTILIZING METAPROGRAMMING AND A DOMAIN ONTOLOGY HAVING A SYNTACTIC AND SEMANTIC SPECIFICATION (71) Applicant: Metaspex LLC, Hayward, CA (US)

(72) Inventor: Vincent Lextrait, Boston, MA (US)

(73) Assignee: Metaspex LLC, Hayward, CA (US)

(*) Notice: Subject to any disclaimer, the term of this patent is extended or adjusted under 35 U.S.C. 154(b) by 0 days.

(21) Appl. No.: 16/838,647

(22) Filed: Apr. 2, 2020

(65) Prior Publication Data

US 2020/0319863 A1 Oct. 8, 2020

Related U.S. Application Data (60) Provisional application No. 62/828,661, filed on Apr. 3, 2019.

(51) Int. Cl.
*G06F 8/41* (2018.01)

(52) U.S. Cl.
CPC ........... *G06F 8/42* (2013.01); *G06F 8/436* (2013.01); *G06F 8/44* (2013.01); *G06F 8/447* (2013.01)

(58) Field of Classification Search
CPC .................. G06F 8/40–443; G06F 8/447
USPC ........................................... 717/136–143
See application file for complete search history.

(56) References Cited

U.S. PATENT DOCUMENTS 7,277,895 B2 * 10/2007 Parkinson ............. G06F 16/986
707/755

| | | | |
|---|---|---|---|
| 10,209,968 B2 * | 2/2019 | Narayana Iyer | G06F 8/40 |
| 10,261,889 B2 * | 4/2019 | Asthana | G06F 11/3628 |
| 10,552,127 B2 * | 2/2020 | Pandey | G06F 8/41 |
| 2003/0065727 A1 * | 4/2003 | Clarke | H04L 63/04 709/206 |
| 2003/0145308 A1 * | 7/2003 | Geisinger | G06F 8/41 717/114 |
| 2005/0049995 A1 * | 3/2005 | Parkinson | G06F 16/986 |
| 2006/0168555 A1 * | 7/2006 | Represas Ferrao | G06F 8/10 717/104 |
| 2013/0167128 A1 * | 6/2013 | Narayana Iyer | G06F 8/41 717/143 |
| 2015/0378871 A1 * | 12/2015 | Asthana | G06F 11/3628 717/122 |

(Continued)

OTHER PUBLICATIONS

Ontology (information science), Wikipedia, 2018, 17 pages, [retrieved on May 20, 2022], Retrieved from the Internet: <URL:https://web.archive.org/web/20180505054616/https://en.wikipedia.org/wiki/Ontology_%28information_science%29>.*

(Continued)

*Primary Examiner* — Geoffrey R ST Leger
(74) *Attorney, Agent, or Firm* — Daquette Law Group, LLC (57) ABSTRACT Embodiments of the innovation relate to, in a development device, a method of generating a backend application for execution by a server device. The method comprises receiving, by the development device, ontology information associated with an enterprise domain, the ontology information including syntactic information and semantic information; applying, by the development device, a metaprogramming engine to the ontology information to generate the backend application; and forwarding, by the development device, the backend application to the server device.

16 Claims, 7 Drawing Sheets (56) References Cited

U.S. PATENT DOCUMENTS

2019/0050208 A1* 2/2019 Pandey .................... G06F 8/42

OTHER PUBLICATIONS

Software development, Wikipedia, 2018, 12 pages, [retrieved on May 20, 2022], Retrieved from the Internet: <URL:https://web.archive.org/web/20180309140114/https://en.wikipedia.org/wiki/Software_development>.*

* cited by examiner

DEVICE AND METHOD FOR PRODUCING A BACKEND APPLICATION UTILIZING METAPROGRAMMING AND A DOMAIN ONTOLOGY HAVING A SYNTACTIC AND SEMANTIC SPECIFICATION

RELATED APPLICATIONS

This patent application claims the benefit of U.S. Provisional Application No. 62/828,661, filed on Apr. 3, 2019, entitled, "System Producing Software Business Applications from Their Domain Ontology Described Using a Syntactic and Semantic Formal Specification Relying on Metaprogramming," the contents and teachings of which are hereby incorporated by reference in their entirety.

BACKGROUND

Enterprises typically provide end users with access to their products and/or services (e.g., ERP, e-commerce, restaurant reservations, etc.) over a network via a web browser. These enterprises can utilize a backend application between the web browser and the enterprise database to access, store, receive, and update information in the database for a particular transaction.

SUMMARY

The development of conventional backend applications can suffer from a variety of deficiencies. For example, enterprises typically utilize human programmers to develop these backend applications. These programmers typically start with an entity relationship model and implement processes manually on top of a query language, such as SQL. Such a manual process is typically costly and labor-intensive. Additionally, with the generally limited availability of qualified programmers, enterprises can have difficulty in finding an adequate human labor force to generate these processes. Further, extending the backend application to additional domains is also typically implemented manually and is therefore, expensive. Additionally, the resulting backend application must be reviewed for quality and manually revised in the case where the application does not meet its performance specification or in the case where the application does not function (e.g., in case where software bugs are present which can result in the application crashing or not delivering the expected functionality).

By contrast to conventional backend applications and backend application development methodologies, embodiments of the present innovation relate to a device and method for producing a backend application utilizing metaprogramming and a domain ontology having a syntactic and semantic formal specification. In one arrangement, an enterprise system includes a development device which is configured to generate a backend application.

During operation, the development device accesses ontology information associated with a particular domain of the enterprise system. For example, in the case where the enterprise system is involved in e-commerce, the development device can access e-commerce ontology information and in the case where the enterprise system provides restaurant reservations, the development device can access restaurant ontology information. The ontology information includes both syntactic information, which provides the high-level rules for the development of the backend application for a domain, and semantic information, which provides definitions for the various concepts which can be derived from the syntactic information. Accordingly, the combination of the syntax and semantics of a given domain forms the ontology information of that domain. The development device can apply a metaprogramming engine to the ontology information to generate and output a functional backend application (e.g., a software-based executable) which can be run on a server device of a datacenter or in the cloud. For example, the backend application can be configured as one or more APACHE modules which can be deployed by AMAZON Web Services or with the GOOGLE Cloud.

The development device can generate the backend application while mitigating, and often completely removing, the dependency on human programmers and quality assurance personnel to produce these applications. For example, the development device can automatically check and implement the specification, provided by the ontology information, at compile time. As such, the development device can alleviate the need for subsequent manual quality assurance of the backend application. Further, the specification check automatically enforces both the syntax of the domain and the compatibility of its semantic rules. For example, the semantic rules govern the value of semantic attributes attached to the syntax. The backend server can calculate the semantic attributes for a backend document based on the semantic rules and can allow the semantic attributes to persist in a database. The database is then used to index over the semantic attributes. As such, for the portions of the backend application which would conventionally rely on SQL or on manual code, the backend device can implement automatically using different algorithms and mechanisms. Accordingly, the backend applications produced by the development device are relatively efficient and do not exhibit the usual performance degradation that conventional top-down high-level domain expert oriented techniques (e.g. traditional 4GLs, or current "low code") suffer.

In one arrangement, embodiments of the innovation relate to, in a development device, a method of generating a backend application for execution by a server device. The method comprises receiving, by the development device, ontology information associated with an enterprise domain, the ontology information including syntactic information and semantic information; applying, by the development device, a metaprogramming engine to the ontology information to generate the backend application; and forwarding, by the development device, the backend application to the server device.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a device and method for producing a backend application utilizing metaprogramming and a domain ontology having a syntactic and semantic formal specification. In one arrangement, an enterprise system includes a development device which is configured to generate a backend application.

During operation, the development device accesses ontology information associated with a particular domain of the enterprise system. For example, in the case where the enterprise system is involved in e-commerce, the development device can access e-commerce ontology information and in the case where the enterprise system provides restaurant reservations, the development device can access restaurant ontology information. The ontology information includes both syntactic information, which provides the high-level rules for the development of the backend application for a domain, and semantic information, which provides definitions for the various concepts which can be derived from the syntactic information. Accordingly, the combination of the syntax and semantics of a given domain forms the ontology information of that domain. The development device can apply a metaprogramming engine to the ontology information to generate and output a functional backend application (e.g., a software-based executable) which can be run on a server device of a datacenter or in the cloud. For example, the backend application can be configured as one or more APACHE modules which can be deployed by AMAZON Web Services or with the GOOGLE Cloud.

The development device can generate the backend application while mitigating, and often completely removing, the dependency on human programmers and quality assurance personnel to produce these applications. For example, the development device can automatically check and implement the specification, provided by the ontology information, at compile time. As such, the development device can alleviate the need for subsequent manual quality assurance of the backend application. Further, the specification check automatically enforces both the syntax of the domain and the compatibility of its semantic rules. For example, the semantic rules govern the value of semantic attributes attached to the syntax. The backend server can calculate the semantic attributes for a backend document based on the semantic rules and can allow the semantic attributes to persist in a database. The database is then used to index over the semantic attributes. As such, for the portions of the backend application which would conventionally rely on SQL or on manual code, the backend device can implement automatically using different algorithms and mechanisms. Accordingly, the backend applications produced by the development device are relatively efficient and do not exhibit the usual performance degradation that conventional top-down high-level domain expert oriented techniques (e.g. traditional 4GLs, or current "low code") suffer.

Figure 1:
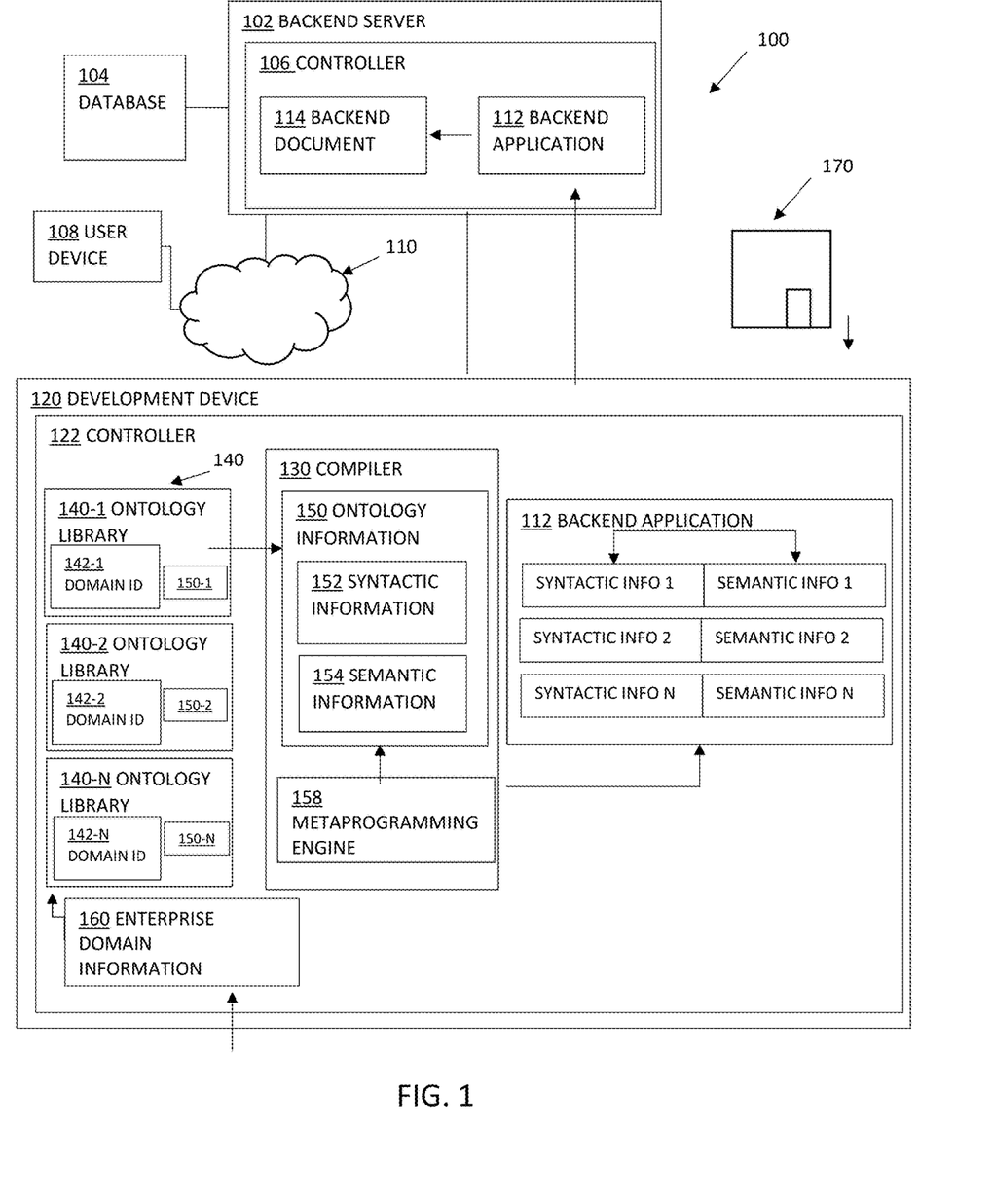
FIG. 1 illustrates a schematic representation of an enterprise system having a development device, according to one arrangement.

FIG. 1 illustrates a schematic representation of an enterprise system 100, according to one arrangement of the innovation. The enterprise system 100 includes a server device or backend server 102 disposed in electrical communication with a database 104. While the backend server 102 can be configured in a variety of ways, in one arrangement, the backend server 102 is a computerized device which includes a controller 106, such as a memory and a processor.

The backend server 102 is configured to provide one or more user devices 108, such as computerized devices, with access to the database 104 via a network 110. In one arrangement, the backend server 102 is configured to execute a backend application 112 in response to a request from the user device 108, such as provided via a web browser. For example, upon receipt of a request for information from the database 104, the backend server 108 is configured to execute the backend application 112 to generate a backend document 114 and to provide the user device 108 with access to the backend document 114. Further, in response to communication from the user device 108, the backend server 102 can access the database 104 to retrieve information for inclusion within the backend document 114 and to store the backend document 114, such as at the conclusion of the session with the user device 108.

The backend application 112, in one arrangement, includes rules which govern both the syntactic attributes or elements and the semantic attributes or elements of the resulting backend document 114. The syntactic attributes of the backend document 114 can relate to defined aspects of the domain or business of an enterprise utilizing the enterprise system 100. For example, in the case where the enterprise is an e-commerce platform, the syntactic attributes of the backend document 114 presented to the user device 108 can include a cart item (e.g., an item being purchased by a user of the user device 108) and an item cost. The semantic attributes of the backend document 114 are calculated or derived, by the backend server 102, based on the semantic rules and the semantic attribute provided by the backend application 112. For example, the semantic attributes of the backend document 114 presented to the user device 108 can include a total item count (e.g., the sum of the number of items in an order) and a total cost (e.g., the sum of all item costs added to the backend document 114 by the user device 108). As the backend server 102 calculates or derives the semantic attribute values, the backend server 102 can store the resulting backend document 114 within the database 104 such that the semantic attributes persist in the database 104. As a result, the database 104 can index over the semantic attributes in each stored backend document. Further, because the semantic attributes persist in the database 104, changes made to the syntactic attributes of the backend document 114, such as at a later date, generates an update to the associated semantic attributes within the document 114. As such, backend server 102 and database 102 maintains up-to-date and accurate values for the semantic attributes.

In one arrangement, the backend server 102 is configured to receive the backend application 112 from a development device 120. For example, the development device 120 is disposed in electrical communication with the backend server 102, such as via a network, and can be configured as a computerized device having a controller 122, such as a memory and a processor. The development device 120 is configured to generate the backend application 112 which is specific to a particular enterprise based upon a domain, or business type, associated with the enterprise. For example, the enterprise can be focused within the security, travel, legal, customer relationship management (CRM), enterprise resource planning (ERP), or e-commerce industries. As such, the development device 120 is configured to generate the backend application 112 relating to each particular industry, or domain, for the enterprise as needed.

In one arrangement, the development device 120 includes a compiler 130 which utilizes ontology information 150 from an ontology library 140 in conjunction with a metaprogramming engine 158 to generate the backend application 112.

In order for the development device 120 to deliver a specific backend application 112 to the backend server 102 for a specific enterprise, the development device 120 utilizes the ontology information 150 from the ontology library 140 to identify the specification of the services offered by the enterprise. The ontology information 150 expresses the services provided by the enterprise as a high-level language which uses primitives produced automatically from the syntax in the ontology.

The ontology information 150 can be configured in a variety of ways. For example, the ontology information 150 can be formatted to define a variety of types (e.g., customer, contract, interaction, etc.) where each type includes a typed attribute, such as an entity, an element, or an anchor. Entities, elements, and anchors can be configured as metatypes, to make them more reusable. For instance, in a simplified programming language, such as C++, for example, a Contract entity is formally described using the following ontology information format:

```
template <typename Supplier, typename Customer, typename Terms>
struct Contract: public entity
{
// ...
link<Supplier> supplier; // link-to
link<Customer> customer; // link-to
own<Terms> terms; // made-of
};
```

It is noted that the parameter type Terms is configured as an element or an anchor, and does not need to "know" of the Contract entity, making it fully reusable as part of the ontology information 150 for the development of the backend application 112 or other backend applications 112. The parameter types Supplier and Customer are configured in a similar manner. Similarly, the Contract meta-entity does not mandate the use of specific Supplier, Customer or Terms types, making it also fully reusable across ontologies.

The ontology information 150 can also define a "links to" relationship. The "links to" relationship follows the following rules: entities can be the target of "links to" relationships; elements cannot be the target of "links to" relationships; anchors can be the target of "links to" relationships.

A variant of the "links to" meta relationship exists to describe situations where the origin of the relationship cannot exist any longer when the target is removed, termed a "hard link." It is typically used when a made-of composite relationship is a one-to-many relationship, and saving the entity in a single document becomes unreasonable in terms of size. In that situation, the relationship is inverted (the target becomes the origin, and conversely), and replaced by a hardlink-to. In the previous example, the contract can be described using:

```
template <typename Supplier, typename Customer, typename Terms>
struct Contract: public entity
{
// ...
hard_link<Supplier> supplier;
hard_link<Customer> customer;
own<Terms> terms;
};
``` which defines the situation where the contract cannot exist without a supplier and a customer.

Based upon the formatting of the ontology information 150, the development device 120 can reuse the ontology library 140 to create a variety of backend applications 112 for a variety of domains.

In one arrangement, the ontology information 150 includes syntactic information 152 which relates to information that defines aspects of the enterprise domain. While the syntactic information 152 can have a variety of formats, in one arrangement, the syntactic information 152 defines aspects of the enterprise domain in a programming language which is supported by the metaprogramming engine 158, such as a simplified C++-like set of instructions.

For example, assume the case where the ontology library 140 to relates to documents which can be generated by a law firm, such as contracts. As such, the ontology information 150 from the ontology library 140 can include, as a portion of the syntactic information 152, language which defines the parties to a contract, an example of which is provided below:

```
template <typename Supplier, typename Customer, typename Terms>
struct Contract: public entity
{
// ...
link<Supplier> supplier; // link-to
link<Customer> customer; // link-to
own<Terms> terms; // made-of
};
```

As indicated, this syntactic information 152 defines a supplier and a customer as contracting parties and links the two entities together. It is noted that this is only an example of the syntactic information 152 maintained as part of the ontology information 150. The ontology information 150 can include a variety of additional syntactical information elements 152 pertaining to the development of a contract for the enterprise.

In one arrangement, the ontology information 150 can also include semantic information 154 which can be derived from or calculated from the syntactic information 152.

For example, again assume the case where the ontology library 140 to relates to documents which can be generated by a law firm, such as contracts. A typical contract includes a start date, an end date, and a duration. As such, the ontology information 150 from the ontology library 140 can include, as syntactic information 152, the start and duration of the agreement. However, since the end date of the agreement can be calculated as the sum of the start date and duration, the ontology information 150 can include the end date of the agreement as semantic information 154. Therefore, the ontology information 150 from the ontology library 140 can include both syntactic and semantic information 152, 154 to define the start date and duration, as well as the end date, an example of which is provided below:

```
struct Contract: public entity
{
// ...
slot<time_t> starting_date;
slot<uint32_t> duration;
// Declaration of the rule calculating the end date
// semantic attribute.
time_t compute_end_date( ) const {
return starting_date + duration;
}
// Declaration of the semantic attribute.
attribute<time_t, &Contract::compute_end_date> end_date;
};
```

Figure 2:
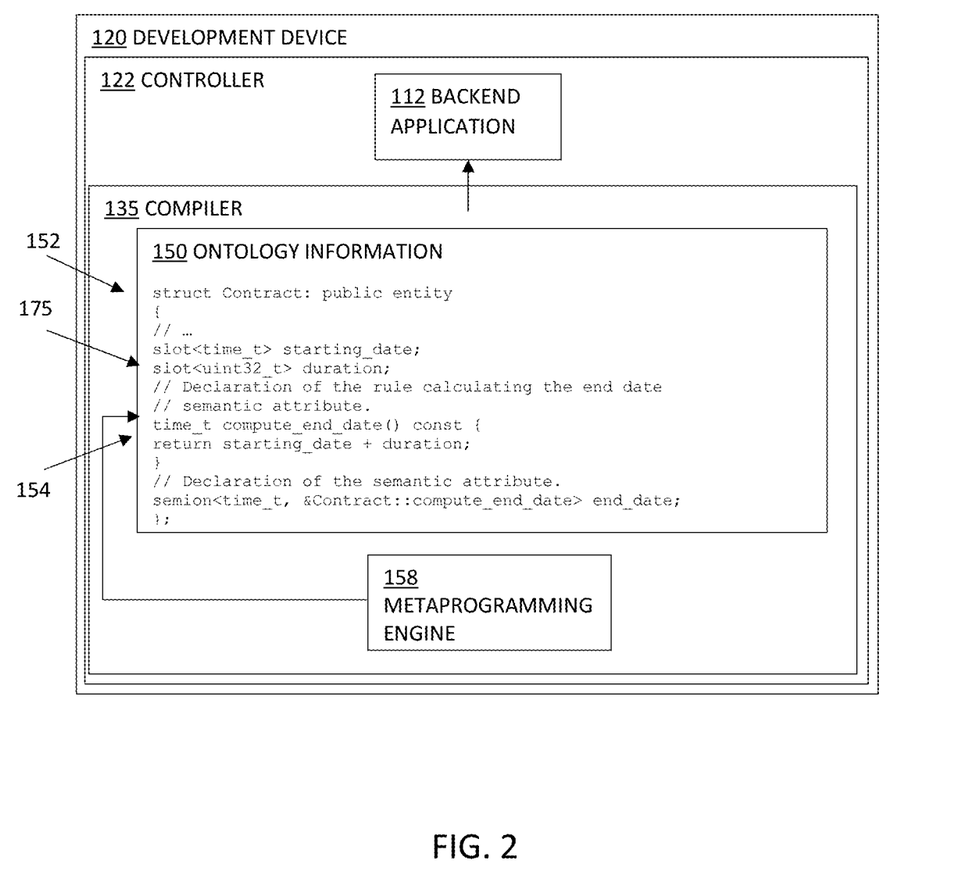
FIG. 2 illustrates a schematic representation of a development device of the enterprise system of FIG. 1, according to one arrangement.

As such, with reference to FIG. 2, the ontology information 150 provides that the semantic information 154 is attached to the syntactic information 152. With this attachment, the semantic information 154, the end date of the contract, is tied to the syntactic information 152, start and end dates for the contract. Such attachment persists in the backend application 112 generated by the development device 120, as indicated in FIG. 1, and in the backend document 114 generated by the backend server 102 from the backend application 112. Accordingly, in the case where a user accesses the backend document 114 and makes a change to the start date or duration of the contract (e.g., the syntactic attributes), the change causes the end date value (e.g., the semantic attribute) to be automatically updated (i.e., as the difference between the end date and start date).

Returning to FIG. 1, the compiler 130 is configured to apply the metaprogramming engine 158 to the ontology information 150. The metaprogramming engine 158 is configured to provide instruction to the compiler 130 to convert the ontology information 150 to the binary code forming the backend application 112.

The controller 122 of the development device 120 can store an application for generating a backend application 122 for execution by the backend server 102. The application installs on the controller 122 from a computer program product 170. In some arrangements, the computer program product 170 is available in a standard off-the-shelf form such as a shrink wrap package (e.g., CD-ROMs, diskettes, tapes, etc.). In other arrangements, the computer program product 170 is available in a different form, such downloadable online media. When performed on the controller 122 of the development device 120, the application causes the development device 120 to generate and provide a backend application 112 to the backend server 102. The backend server 102 is configured to execute the backend application 122 and to generate a backend document 114 which relates syntactic attributes to semantic attributes.

Figure 3:
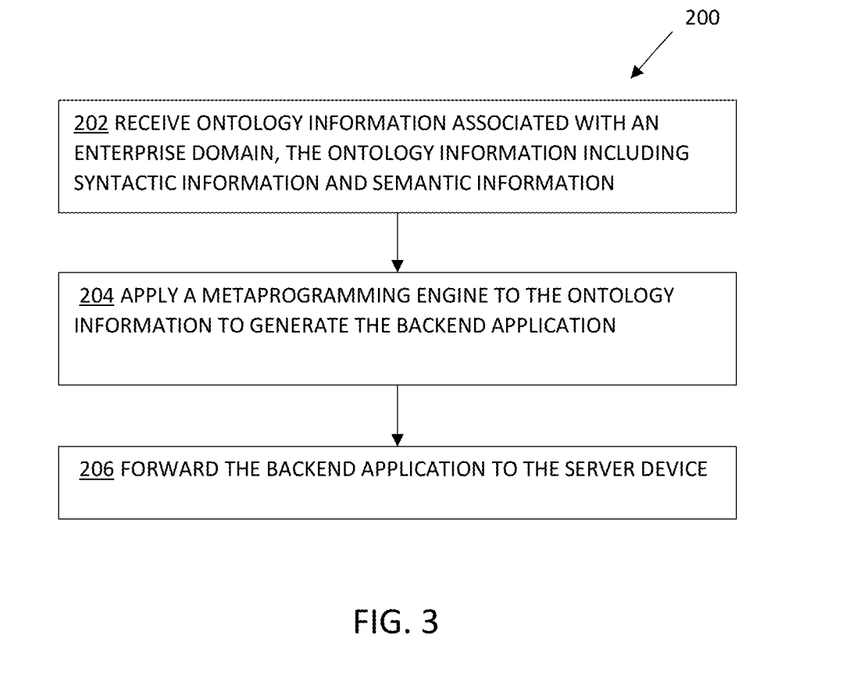
FIG. 3 illustrates a flowchart of a process performed by the development device of FIG. 1, according to one arrangement.

As provided above, the development device 120 is configured to generate a backend application 112 for use by the backend server 102. FIG. 3 illustrates a flowchart 202 of a process performed by the development device 120 when generating the backend application 112.

In element 202, the development device 120 receives ontology information 150 associated with an enterprise domain, the ontology information 150 including syntactic information 152 and semantic information 154. In one arrangement, the ontology information 150 relates to a set of rules associated with a particular domain, or business area, of an enterprise along with the relationships among the rules. For example, ontology information 150 for a law firm domain can include the rules and relationships used for generating a contract while ontology information 150 for an ERP system can include the rules and relationships used for generating a an online shopping cart. Therefore, the ontology information 150 is specific to a particular domain being specified (e.g., security, travel, legal, CRM, ERP, eCommerce, etc.).

In one arrangement, the development device 120 can be preconfigured to include a variety of ontology libraries 140 having corresponding ontology information 150 for a variety of domains. For example, with reference to FIG. 1, the ontology library 140 can include a first ontology library 140-1 identified with a first domain identifier 142-1, a second ontology library 140-2 identified with a second domain identifier 142-2, and an $n^{th}$ ontology library 140-N identified with an $n^{th}$ domain identifier 142-N.

With such a configuration, the enterprise can provide information to the development device 120 to drive selection of the appropriate ontology library 140 for generation of the back end application. In one arrangement, the enterprise initiates the generation of the backend application 112 by providing the development device 120 with enterprise domain information 160 which identifies the domain, or the business, which pertains to the enterprise.

Next, the development device 112 is configured to access a particular ontology library 140 based upon a correspondence between the enterprise domain information 160 and the enterprise domain identifier 142 associated with the 140 ontology library. For example, assume the case where the enterprise domain information 160 identifies the enterprise as a law firm. Further assume that the first domain identifier 142-1 indicates the first ontology library 140-1 as being an ERP library, the second domain identifier 142-2 indicates the second ontology library 140-2 as being a legal library, and the $n^{th}$ domain identifier 142-N indicates the $n^{th}$ ontology library 140 as being a travel library. As the development device 120 compares the enterprise domain information 160 with each domain identifier 142-1, 142-2, 142-N, the development device 120 can identify a correspondence between the enterprise domain information 160 and the second domain identifier 142-2. In such a case, the development device 120 can retrieve the ontology information 150 associated with the legal library from the second ontology library 140-2 and can provide the retrieved ontology information 150 to the compiler 130 for further processing.

Returning to FIG. 2, in element 204, the development device 120 applies a metaprogramming engine 158 to the ontology information 150 to generate the backend application 112. For example, as indicated above, the metaprogramming engine 158 can be configured to instruct the compiler 150 regarding the implementation of the ontology information 150. While this can be achieved in a variety of ways, FIG. 2, illustrates an example implementation.

As indicated in FIG. 2, the development device 120 identifies a metaprogramming tag 175 associated with each of the syntactic information 152 and the semantic information 154. For example, in reviewing the ontology information 150, the development device 120 can identify the term "slot" and the term "compute_end_date" as metaprogramming tags 175 associated with syntactic information 152 and the semantic information 154, respectively. Once identified, the development device 120 can apply the metaprogramming engine 158 to each of the tags 175 for the syntactic information and semantic information to generate the backend application based upon the corresponding metaprogramming tag. For example, based upon the metaprogramming tag 175 identified, the metaprogramming engine 158 can apply a particular set of process to each tagged element to convert each element to binary code as part of the backend application 112.

In one arrangement, when the compiler 135 generates the backend application 112, the compiler 135 is configured to include a runtime engine as part of the backend application 112. In use, the backend server 102 is configured to utilize the runtime engine to execute the backend application 112 to generate the backend document 114.

Returning to FIG. 3, in element 206, the development device 120 forwards the backend application 112 to the backend server 102. For example, the development device 120 can transmit the backend application 112 to the backend server 102 via a network communication connection. As will be described below, the backend server 102 can utilize the backend application 112 to generate backend documents 114 which include both syntactic and semantic elements which persist within the documents 114.

As provided above, the development device 120 is configured to generate a backend application 112 which is based upon syntactic and semantic information 152, 154 included in an ontology library for a particular domain. As such, the development device 120 is configured to automatically customize the backend application 112 for a particular enterprise domain while mitigating the programming time typically experienced during a manual process. As such, the development device 120 resolves issues relating to programmer availability and cost during conventional backend application development. Additionally, with the iterative application of optimizations and techniques being beyond the realistic abilities of human labor, the development device 120 can perform higher quality work compared to human programmers. Accordingly, the backend application 112 generated by the development device 120 is of a relatively higher quality than conventionally developed backend application. Further, because the compiler 130 reviews the metaprogramming tags 175 (e.g., rules) at the time of compiling, the development device 120 can generate a backend application 112 is substantially, if not entirely, error free. As such, the development device 120 can generate backend applications 112 of both high quality and increasing complexity relative to conventional development methods.

Figure 4:
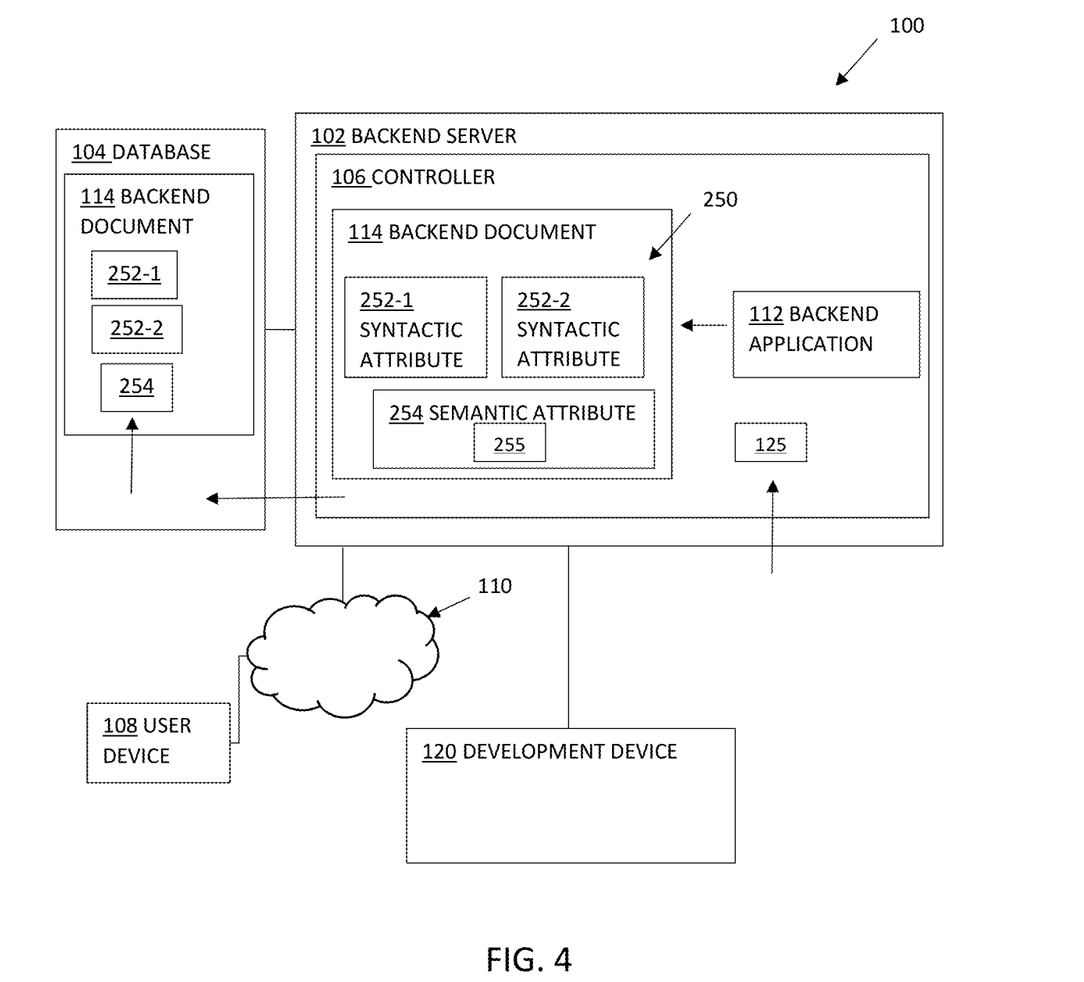
FIG. 4 illustrates a schematic representation of a backend server of the enterprise system, according to one arrangement.

With reference to FIG. 4, once received from the development device 120, the controller 106 of the backend server 102 can store the backend application 112. The backend server 102 is configured to execute the backend application 112 to generate a backend document 114 in response to receipt of an execution command 125. For example, the user device 108 can generate, as the execution command 125, a request to interact with a particular backend document 114, such as via a web browser.

When the backend server receives execution command 125, such as the request from the user device 108, the backend server 102 can execute the backend application 112 to generate the backend document 114. As indicated in FIG. 4, the backend document 114 includes syntactic attributes 250 and semantic attributes 252. In one arrangement, the syntactic attributes 250 are configured as form fillable fields, or slots, which can store information requested in the backend document 116 and provided by the user device 108. Further, the semantic attributes 252 are configured as fields that display a semantic attribute value 255 which are derived from the syntactic attributes 250 and semantic attribute rules.

For example, assume the case where the backend document 114 is a contract where the first syntactic attribute 252-1 relates to the start date of the contract and the second syntactic attribute 252-2 relates to the duration of the contract. The user device 108 can interact with the backend document 114 to enter the start date and the duration as the first and second syntactic attributes 252-1, 252-2, respectively. As a result of such entry, and based upon the semantic rules that govern the value of semantic attributes 254, the backend document 114 can automatically update the value 255 of the semantic attribute 254, i.e. the end date of the contract, based upon the rule associated with the semantic attribute, i.e., the sum of the start date 252-1 and the duration 252-2.

Following generation of the backend document 114, the addition of syntactic attributes 250, such as by an end user, and the generation of semantic attribute values 255, in one arrangement, the backend server 102 can store the document 114 within the database 104 and can index the backend document 114 based on the syntactic attributes 250 and the semantic attributes 252. As such, an end user can search the database 104 for documents containing either type of attribute 250, 252.

In one arrangement, the semantic attribute 254 of the backend document 114 can persist within the document 114 within a single database 114 or across multiple databases. For example, following entry of the syntactic attributes 252-1, 252-2, the backend document 114 includes not only the value for the resulting semantic attribute 254 but also the relationships with the syntactic attributes 252-1, 252-2 that define the semantic attribute 254. As such, any changes made to the syntactic attributes 252-1, 252-2 within the backend document 114 will cause the backend document to update the corresponding semantic attribute 254. The backend server 102 can provide these updates in the backend document 114 to the user device 108, such as via a graphical user interface or web browser.

Figure 5:
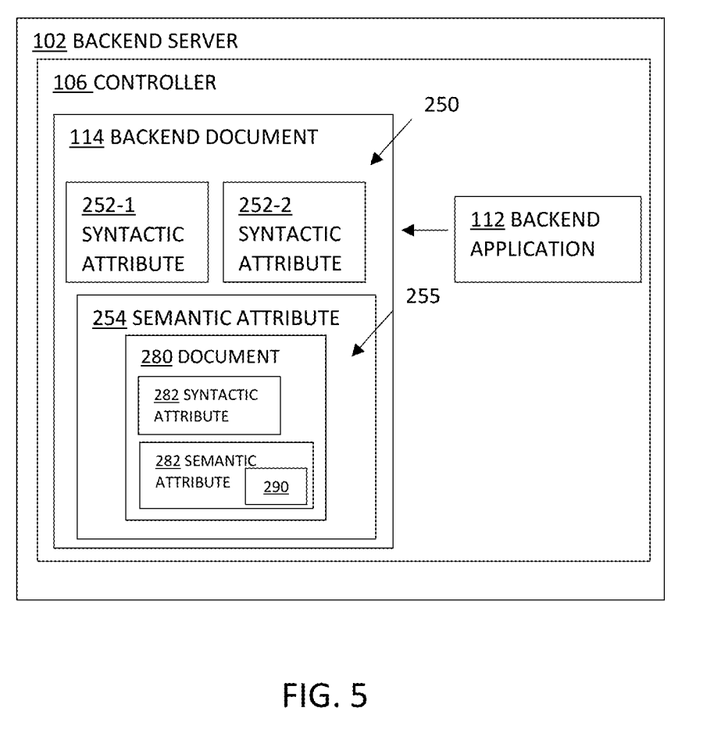
FIG. 5 illustrates a backend document generated by the backend server of FIG. 1 wherein asemantic attributes value is configured as a nested document, according to one arrangement.

As indicated above, a semantic attribute 254 of a backend document 114 is configured to include semantic attribute values 255, such as integer, string, or Boolean values, which the backend document 114 derives based upon the syntactic attributes 250 and associated rules. Such indication is by way of example only. In one arrangement, and with reference to FIG. 5, the semantic attribute 254 is configured to include, as a semantic attribute value 255, a structure such as one or more nested documents 280. As such, the backend server 102 can represent a document 280 as an incremental semantic evaluation of another document 114. Each nested document 280 can be derived from ontology information, such as described above with respect to backend document 114, and can include both syntactic attributes 282 and semantic attributes 284. As such, in the case where the backend document 114 updates the semantic attribute value 255 of the semantic attribute 254, the backend document 114 is configured to update the semantic attributes 284 and corresponding semantic attribute values of the nested document 280. Further, the semantic attribute 284 of the nested document 280 can include as a semantic attribute value, a further nested document 290.

As provided above, the backend server 102 can receive the backend application 112 from the development device 120 and can generate a backend document 114 which is accessible by an end user via a user device. In certain cases, however, the enterprise may want to limit or define the user's access to certain aspects of the enterprise system 100. For example, in the case where the enterprise is involved with e-commerce, the enterprise may want to limit customer interaction with the enterprise system 100 to the addition and removal of items for purchase from an ecommerce cart but may want to provide an enterprise employee with the ability to offer or withdraw the offer for sale of products through the enterprise.

Figure 6:
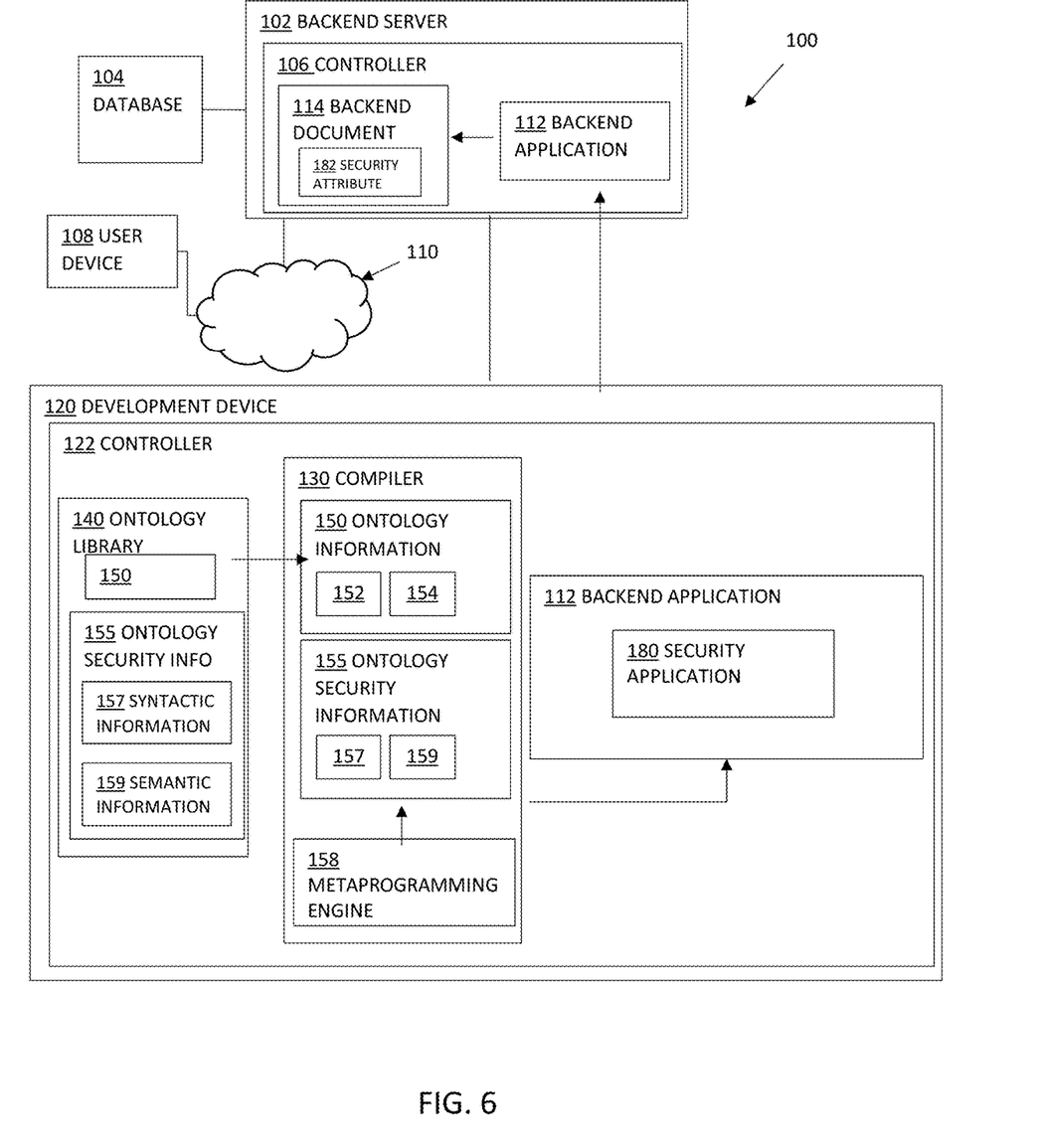
FIG. 6 illustrates a schematic representation of an enterprise system having a development device utilizing ontology security information to generate a backend application, according to one arrangement.
Figure 7:
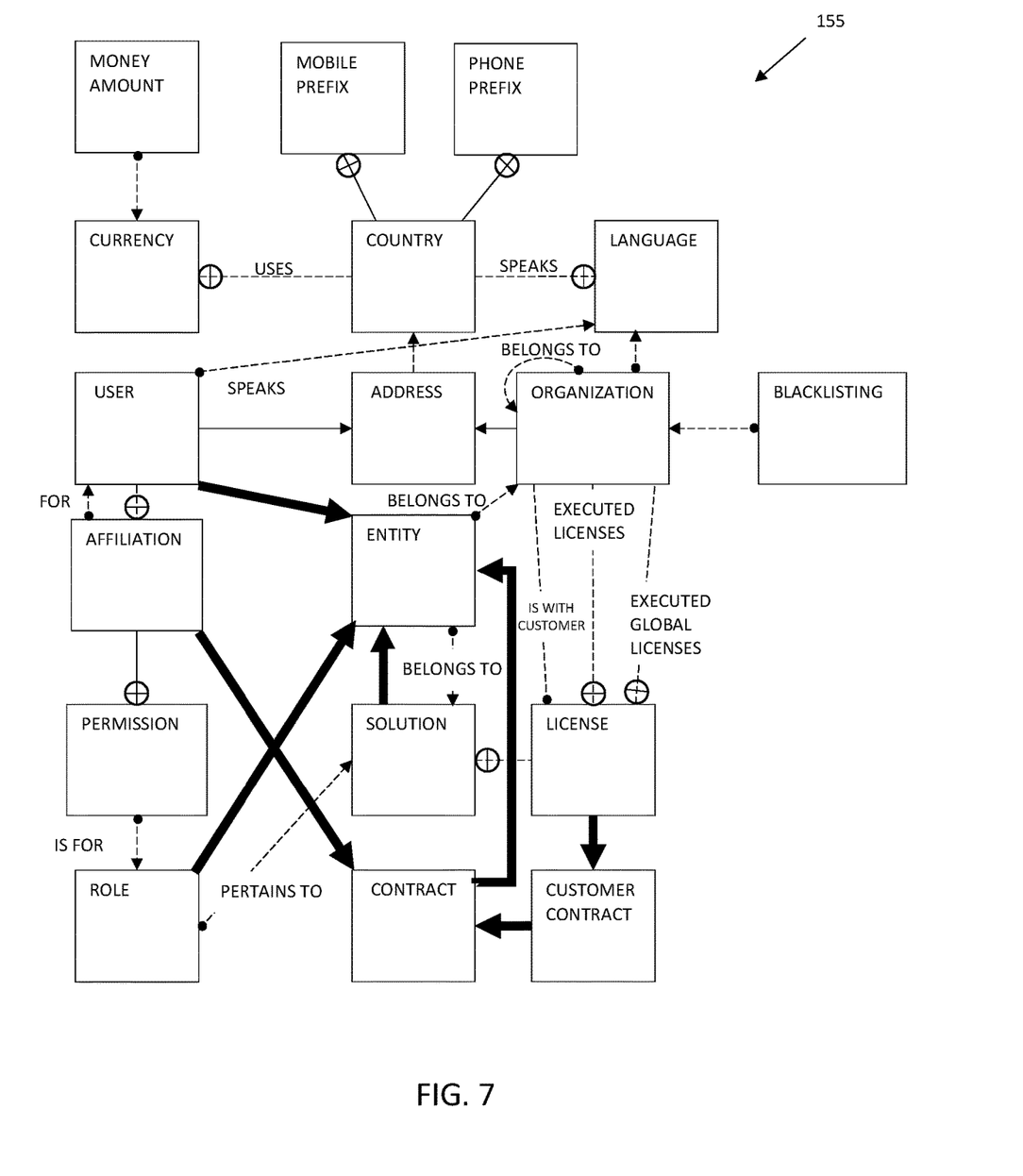
FIG. 7 illustrates example ontology security information, according to one arrangement.

In such a case, with reference to FIG. 6, the development device 120 can be configured to incorporate a security application 180 with the backend application 112 to define a given user's role with the enterprise and to allow or deny access to aspects of the enterprise system 100. For example, during operation, the development device 120 can retrieve ontology security information 155 from an ontology library 140 associated with an enterprise domain. The ontology security information 155 includes syntactic information 157 and semantic information 159 to define the role of an end user of the backend server 102. While the ontology security information 155 can include a variety of types of syntactic information 157 and semantic information 159, FIG. 7 provides a graphical representation of the information 157, 159, along with their relationships. As illustrated, double arrows indicate inheritance of the target on the origin, dotted arrows represent links, and solid arrows represent made-of relationships. Further, rounded plus signs at the end of a relationship denote their composite nature while a solid black dot at the origin of a link relationship identifies it is as a hard link.

Returning to FIG. 6, the development device 120 is configured to apply the metaprogramming engine 158 to the ontology information 150 and to the ontology security information 155 to generate the backend application 112 having an associated security application 180. Following delivery of the backend application 112 to the backend server 102, the backend server can execute the security application to generate a security attribute 182. The end user can interact with the security attribute 182 to provide particular credentials to the backend server 102 to access some aspect of the enterprise system 100.

While various embodiments of the innovation have been particularly shown and described, it will be understood by those skilled in the art that various changes in form and details may be made therein without departing from the spirit and scope of the innovation as defined by the appended claims.

What is claimed is:

1. In a development device, a method of generating a backend application for execution by a server device, comprising:
  receiving, by the development device, ontology information defining aspects of an enterprise domain, the ontology information having a list of types, each type of the list of types configured to carry at least one attribute, the ontology information including syntactic information rules and semantic rules,
  each syntactic rule of the syntactic rules comprising an origin type and one or more target types and establishing relationships between the origin type and the one or more target types,
  each type of the list of types appearing as an origin and as one or more targets in the syntactic rules,
  a same type of the list of types configured to appear multiple times as an origin and as one or more targets in the syntactic rules,
  the semantic rules attached to any type of the list of types, each semantic rule of the semantic rules expressed as an evaluation function, each semantic rule identifying bidirectional dependencies between a semantic attribute value and data of at least one of the same type and a different type of the list of types,
  the evaluation function, referencing at least one of other semantic attributes, the attributes defined by the enterprise domain, relationships, changes in the attributes defined by the enterprise domain, and changes in the relationships, configured to propagate to dependent semantic attributes;
  indexing, by the development device, the semantic attribute value in a searchable database;
  applying, by the development device, a metaprogramming engine to the ontology information to generate the backend application, the backend application being configured to manage backend documents, the backend documents following at least one syntactic rule and bearing at least one semantic attribute, the semantic attribute configured to be calculated from the evaluation function; and
  forwarding, by the development device, the backend application to the server device.

2. The method of claim 1, wherein receiving ontology information associated with an enterprise domain comprises:
  receiving, by the development device, enterprise domain information from an enterprise;
  accessing, by the development device, an ontology library based upon a correspondence between the enterprise domain information and an enterprise domain identifier associated with the ontology library; and
  retrieving, by the development device, the ontology information associated with the enterprise domain from the ontology library.

3. The method of claim 1, wherein receiving ontology information associated with the enterprise domain comprises receiving ontology information associated with the enterprise domain where the semantic rules are attached to the syntactic rules.

4. The method of claim 1, wherein applying the metaprogramming engine to the ontology information to generate the backend application comprises:
  identifying, by the development device, a metaprogramming tag associated with each of the syntactic rules and the semantic rules; and
  applying, by the development device, the metaprogramming engine to each of the corresponding metaprogramming tags for the syntactic rules and semantic rules to generate at least a portion of the backend application.

5. The method of claim 1, wherein:
  receiving ontology information associated with the enterprise domain further comprises receiving, by the development device, ontology security information associated with the enterprise domain, the ontology security information including syntactic information and semantic information for defining a role of an end user of the server device; and
  applying the metaprogramming engine to the ontology information to generate the backend application comprises applying, by the development device, the metaprogramming engine to the ontology information and to the ontology security information to generate the backend application having an associated security application.

6. The method of claim 1, wherein the at least one semantic attribute of the backend document is derived from one or more of at least one syntactic attribute.

7. The method of claim 1, wherein the at least one semantic attribute comprises, as a semantic attribute value, a nested document.

8. An enterprise system, comprising:
a server device having a controller comprising a memory and a processor; and
a development device disposed in electrical communication with the server device, the development device having a controller comprising a memory and a processor;
wherein the development device is configured to:
receive ontology information defining aspects of an enterprise domain, the ontology information having a list of types, each type of the list of types configured to carry at least one attribute, the ontology information including syntactic rules and semantic rules,
each syntactic rule of the syntactic rules comprising an origin type and one or more target types and establishing relationships between the origin type and the one or more target types,
each type of the list of types appearing as an origin and as one or more targets in the syntactic rules,
a same type of the list of types configured to appear multiple times as an origin and as one or more targets in the syntactic rules,
the semantic rules attached to any type of the list of types, each semantic rule of the semantic rules expressed as an evaluation function, each semantic rule identifying bidirectional dependencies between a semantic attribute value and data of at least one of the same type and a different type of the list of types,
the evaluation function, referencing at least one of other semantic attributes, the attributes defined by the enterprise domain, relationships, changes in the attributes defined by the enterprise domain, and changes in the relationships, configured to propagate to dependent semantic attributes;
index the semantic attribute value in a searchable database;
apply a metaprogramming engine to the ontology information to generate the backend application, the backend application being configured to manage backend documents, the backend documents following at least one syntactic rule and bearing at least one semantic attribute, the semantic attribute configured to be calculated from the evaluation function; and
forward the backend application to the server device.

9. The enterprise system of claim 8, wherein when receiving ontology information associated with an enterprise domain, the development device is configured to:
receive enterprise domain information from an enterprise;
access an ontology library based upon a correspondence between the enterprise domain information and an enterprise domain identifier associated with the ontology library; and
receive the ontology information associated with the enterprise domain from the ontology library.

10. The enterprise system of claim 8, wherein when receiving ontology information associated with the enterprise domain, the development device is configured to receive ontology information associated with the enterprise domain where the semantic rules is attached to the syntactic rules.

11. The enterprise system of claim 8, wherein when applying the metaprogramming engine to the ontology information to generate the backend application, the development device is configured to:
identify a metaprogramming tag associated with each of the syntactic rules and the semantic rules; and
apply the metaprogramming engine to each of the corresponding metaprogramming tags for the syntactic rules and semantic rules to generate at least a portion of the backend application.

12. The enterprise system of claim 8, wherein:
when receiving ontology information associated with the enterprise domain, the development device is further configured to receive ontology security information associated with the enterprise domain, the ontology security information including syntactic information and semantic information for defining a role of an end user of the server device; and
when applying the metaprogramming engine to the ontology information to generate the backend application, the development device is further configured to apply the metaprogramming engine to the ontology information and to the ontology security information to generate the backend application having an associated security application.

13. The enterprise system of claim 8, wherein the at least one semantic attribute of the backend document is derived from one or more of at least one syntactic attribute.

14. The enterprise system of claim 8, wherein the at least one semantic attribute comprises, as a semantic attribute value, a nested document.

15. The enterprise system of claim 8, wherein the server device is configured to:
store the backend document in a database; and
index the backend document based on at least one semantic attribute included in the backend document.

16. A computer program product having a non-transitory computer-readable medium including computer program logic encoded thereon that, when performed on a controller of a development device causes the development device to:
receive ontology information defining aspects of an enterprise domain, the ontology information having a list of types, each type of the list of types configured to carry at least one attribute, the ontology information including syntactic rules and semantic rules,
each syntactic rule of the syntactic rules comprising an origin type and one or more target types and establishing relationships between the origin type and the one or more target types,
each type of the list of types appearing as an origin and as one or more targets in the syntactic rules,
a same type of the list of types configured to appear multiple times as an origin and as one or more targets in the syntactic rules,
the semantic rules attached to any type of the list of types, each semantic rule of the semantic rules expressed as an evaluation function, each semantic rule identifying bidirectional dependencies between a semantic attribute value and data of at least one of the same type and a different type of the list of types,
the evaluation function, referencing at least one of other semantic attributes, the attributes defined by the enterprise domain, relationships, changes in the attributes defined by the enterprise domain, and changes in the relationships, configured to propagate to dependent semantic attributes;
index the semantic attribute value in a searchable database;
apply a metaprogramming engine to the ontology information to generate the backend application, the backend application being configured to manage backend documents, the backend documents following at least one syntactic rule and bearing at least one semantic attribute, the semantic attribute configured to be calculated from the evaluation function; and
forward the backend application to a server device.

\* \* \* \* \*